March 2, 1948.   J. E. ESHBAUGH   2,437,187
VALVE FOR AIRCRAFT COOLING SYSTEMS
Filed Jan. 14, 1944
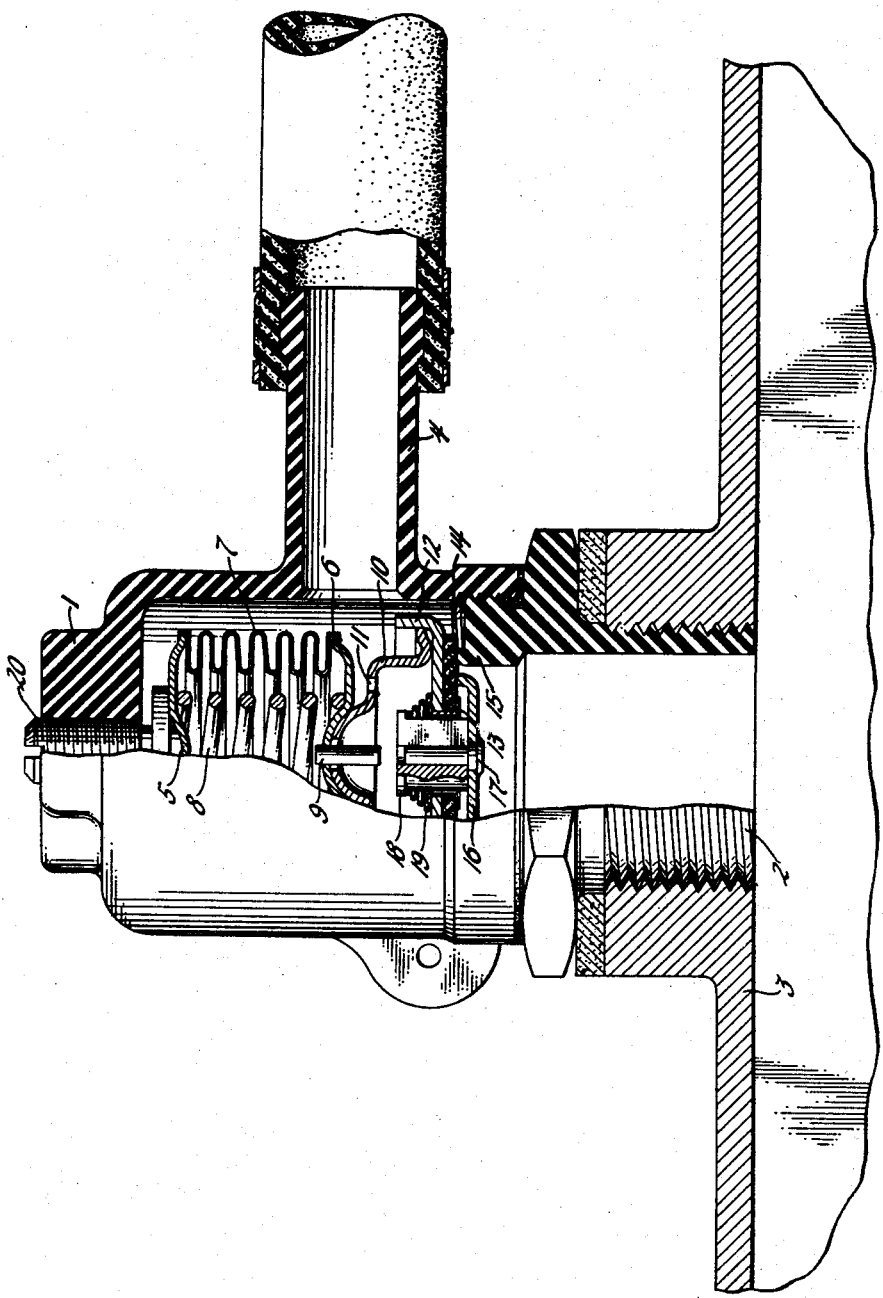
Inventor
Jesse E. Eshbaugh
By Blackmore, Spencer & Hunt
Attorneys

UNITED STATES PATENT OFFICE 2,437,187

VALVE FOR AIRCRAFT COOLING SYSTEMS

Jesse E. Eshbaugh, Flint, Mich., assignor to General Motors Corporation, Detroit, Mich., a corporation of Delaware Application January 14, 1944, Serial No. 518,279

2 Claims. (Cl. 137—153)

This invention relates especially to aircraft engine cooling systems and more particularly to a pressure relief valve which compensates automatically for changes in atmospheric pressure at different altitudes of flight. In effect the action of the atmospheric pressure on the valve is nullified so that the valve is maintained on its seat solely by the force of its valve seating spring and is unseated by internal system pressure in excess of the spring force and independent of the value of external atmospheric pressure at any elevation.

Because pressure on a liquid increases its boiling point it is common practice to improve engine cooling efficiency by sealing the circulating system with a safety blowoff valve so that heat expansion of the system contents builds up an internal pressure within a safe limit beyond which the valve opens to relieve excess pressure. An inwardly opening valve also is provided to prevent less than atmospheric pressure as the system cools down. As heretofore constructed the main disk valve has been seated over the overflow vent by a coil spring exerting a seating force of predetermined amount currently in the neighborhood of fifteen pounds. Thus one face of the disk valve is exposed to internal system pressure to push the valve open when the spring force is exceeded. The opposite face of the disk valve is exposed to exterior atmospheric pressure, which is approximately fifteen pounds per square inch at ordinary low ground or sea level, and since this pressure decreases at higher altitudes the spring force becomes ineffective to maintain the desired internal pressure in the cooling system wherefore the liquid boiling point drops and seriously decreases engine efficiency.

Accordingly the present invention contemplates an improved pressure control valve whose blowoff point is not decreased by a reduction in atmospheric pressure at the higher altitudes. To this end there is incorporated in the valve assembly an aneroid device whose tendency to expand with reduced atmospheric pressure compensates automatically for the lower pressure on the valve surface exposed to atmosphere. By fixing the movable end of the aneroid to the valve and arranging the exposed surface area of the aneroid in opposition to the exposed surface area of the valve the atmospheric pressure on one will balance the atmospheric pressure on the other so that regardless of variations in external atmospheric pressure the valve closing spring becomes the sole agency for seating the valve against internal system pressures. In other words with the aneroid device fixed at one end in relation with the valve seat a reduction in atmospheric pressure will tend to allow aneroid expansion and movement of its opposite end toward the valve seat and the same pressure drop tends to promote valve movement away from its seat, but because the valve is joined to the movable end of the aneroid the opposing tendencies cancel one another.

Instead of having the movable end of the aneroid seating directly over the vent port, in which case there would be no valve surface exposed to atmosphere, the present device in its preferred embodiment has the movable end of the aneroid axially spaced from the valve and the intervening space enables placement of the secondary or inwardly opening valve over an opening in the main valve for communication through the opening from the exterior to the interior of the system when system pressure drops below atmospheric pressure and sucks the secondary or vacuum relief valve off its seat until the pressures inside and outside the system are balanced.

The single view in the drawing illustrates the pressure control valve partly in section and fitted to a wall constituting a part of the engine cooling system, which conveniently may be the surge tank. Optionally the valve casing may be fitted to the radiator filler spout, in which case the main body or casing 1 may have its lower end threaded or otherwise formed for connection with corresponding mating parts on the filler spout, in which case the screw threaded extension 2 of the end fitting can be omitted. As shown in the drawing this end tubular part 2 is threaded into the opening in the surge tank wall 3 and the opposite end of the fitting is threaded into the end of the casing 1. The hollow fitting forms the system vent which normally is closed by the valve assembly contained within the casing 1 and the casing is vented as by means of the overflow or vent tube 4 projecting laterally from the casing and to which may be connected, if desired, a length of hose or tubing leading to a convenient discharge point. The spring loaded aneroid device contained within the casing includes a pair of opposite end walls 5 and 6 and a connecting bellows or flexible wall 7, together with a coil spring 8 seated at opposite ends on the stiff end walls 5 and 6. The bellows is sealed and may contain air at atmospheric pressure or it may first be evacuated and then sealed by means of the plug 9 carried centrally by the wall 6 and projecting downwardly therefrom. A rounded depression centrally of the wall 6 forms a seat for the rounded nose at the center of a spacer cup 10 which has an enlarged opening receiving the projected plug 9. The wall of the spacer 10 is formed with one or more breather openings as shown at 11 and its periphery is press fitted or otherwise secured to the annular stiffening flange of a centrally apertured disk or main valve 12. A hollow rivet 13 located in the central aperture secures on the underside of the disk 12 a flexible gasket 14 of rubber, neoprene or the like, which seats at its periphery on a raised rib 15 surrounding the vent opening through the fitting 2. Also seated on the gasket 14 is the vacuum valve disk 16 which is secured by a rivet 17 to a spacer 18 projecting through the hollow rivet and forming a seat for a volute spring 19 which seats the valve 16 but yields to allow the valve to be sucked in for relieving internal depression.

The main valve is held on its seat by the force of the coil spring 8 interposed between the end walls 5 and 6, the latter of which is movable with the valve 12. The end wall 5 is anchored or fixed in relation to the valve seat and bears against the head of a calibrating stud 20 threaded in the end wall of the casing and adjustable to vary spring pressure. It will be noted that the exposed surfaces of the movable end wall 6 and the exposed surface of the valve 12 as regards atmospheric pressure are opposed to each other so that the drop in pressure which might tend to allow the valve 12 to move out of its seat at a lesser internal system pressure is also decreased on the exposed face of the wall 6 so that the opposing tendencies cancel one another and regardless of the external pressure the action of the valve 12 is dependent entirely on the opposing forces of the spring 8 acting to seat the valve and the internal pressure tending to open the valve.

I claim:

1. In a blowoff vent valve for a normally closed pressure system, a casing vented to atmosphere and having a vent port for connection with the system, a series of three axially spaced stiff walls within the casing, means axially fixing one of said walls to the casing, a flexible bellows joining the last mentioned wall to the intermediate wall to form a sealed chamber therebetween and constituting therewith an expansible aneroid responsive to atmospheric pressure change within the vented casing and said aneroid and the remaining wall being so arranged as to present substantially the same effective surface area to atmospheric pressure, spring means active on the intermediate wall to expand the bellows, a rigid connection between the intermediate wall and the remaining wall to locate the same for closing the port under pressure of said spring means, said last mentioned wall having an opening therein for communicating the system port with the vented axial space between said last mentioned wall and said intermediate wall and a valve normally closing said opening and responsive to vent port pressure below atmosphere to open the same.

2. An engine cooling system pressure relief valve assembly including a casing open to external atmosphere and having a system vent for connection with the system, an outwardly opening main valve to close said vent, an aneroid having axially spaced end walls, one of which is fixed to the casing and the other of which is fixed to the valve in axially spaced relation thereto in its peripheral portion and so arranged as to present to atmosphere an effective surface area substantially equal to the effective valve surface area presented to atmosphere, an inwardly opening valve carried by the main valve so that when open the system vent communicates with external atmosphere through the space between the main valve and the adjacent end wall of the aneroid, and spring means interposed between the aneroid end walls to seat the main valve against the vent pressure.

JESSE E. ESHBAUGH.

REFERENCES CITED

The following references are of record in the file of this patent:

UNITED STATES PATENTS

| Number | Name | Date |
|---|---|---|
| 1,981,965 | Morgan | Nov. 27, 1934 |
| 2,266,314 | Eshbaugh | Dec. 16, 1941 |
| 2,313,149 | Jacobson | Mar. 9, 1943 |
| 2,338,505 | Gregg | Jan. 4, 1944 |
| 2,345,547 | Roth | Mar. 28, 1944 |